United States Patent
Prassas et al.

[11] Patent Number: 5,921,586
[45] Date of Patent: Jul. 13, 1999

[54] VARIABLE SIZE FITTING

[75] Inventors: Thomas N. Prassas, Glendale; Shannon Bard, Scottsdale, both of Ariz.

[73] Assignee: Aquapore Moisture Systems, Inc., Phoenix, Ariz.

[21] Appl. No.: 08/869,498

[22] Filed: Jun. 5, 1997

Related U.S. Application Data

[60] Provisional application No. 60/038,183, Feb. 14, 1997.

[51] Int. Cl.$^6$ ............................. F16L 25/00; F16L 37/05
[52] U.S. Cl. ..................... 285/12; 285/148.23; 285/331
[58] Field of Search .................. 285/12, 148.18, 285/148.23, 255, 256, 331, 339, 342, 343, 382.7

[56] References Cited

U.S. PATENT DOCUMENTS

| | | | |
|---|---|---|---|
| 826,678 | 7/1906 | Marks . | |
| 1,687,445 | 10/1928 | Hazard . | |
| 2,598,961 | 6/1952 | Andrus | 137/78 |
| 2,755,985 | 7/1956 | Finegan | 299/83 |
| 2,757,966 | 8/1956 | Samiran | 299/105 |
| 2,940,777 | 6/1960 | Lundberg | 285/5 |
| 3,606,396 | 9/1971 | Prosdocimo | 285/148.18 |
| 3,833,019 | 9/1974 | Diggs | 138/45 |
| 3,958,761 | 5/1976 | Watanabe | 239/542 |
| 3,971,577 | 7/1976 | Schemith | 285/238 |
| 4,157,843 | 6/1979 | Trnka et al. | 285/339 X |
| 4,722,481 | 2/1988 | Lemkin | 239/542 |
| 4,810,008 | 3/1989 | Brodie | 285/31 |
| 4,971,366 | 11/1990 | Towsley | 285/12 |
| 5,069,388 | 12/1991 | Prassas et al. | 239/145 |
| 5,104,150 | 4/1992 | Bard et al. | 285/12 |
| 5,131,597 | 7/1992 | Bard et al. | 239/145 |
| 5,257,826 | 11/1993 | Prassas et al. | 285/175 |
| 5,275,447 | 1/1994 | McNab | 285/177 |

FOREIGN PATENT DOCUMENTS

| | | |
|---|---|---|
| 275657 | 7/1966 | Australia . |
| 406685 | 2/1934 | United Kingdom . |
| 1246490 | 9/1971 | United Kingdom . |
| 1421452 | 1/1976 | United Kingdom . |

*Primary Examiner*—Anthony Knight
*Assistant Examiner*—Gary Grafel
*Attorney, Agent, or Firm*—Marvin E. Jacobs

[57] ABSTRACT

A universal fitting for connecting together non-porous irrigation tubing having different diameters. The fitting is closable at one or more openings with caps so that the one fitting can be used as an elbow, coupling, tee, or end cap thus avoiding the stocking or purchase of many different kinds of fitting for various diameters of irrigation hose.

10 Claims, 2 Drawing Sheets

VARIABLE SIZE FITTING

CROSS-REFERENCE TO PROVISIONAL APPLICATION

The present application is a complete application of Provisional Application Ser. No. 60/038,183 filed Feb. 14, 1997.

TECHNICAL FIELD

This invention relates to irrigation systems that use a variety of components selected individually and connected together to form a customized watering system tailored to the particular arrangement of plants served by the system. More specifically, a new fitting is disclosed that can replace a large number of different type prior art fittings so as to make the selection of components easier, save money, increase flexibility, and simplify future modifications and, configurations and layout of the watering system.

BACKGROUND OF THE INVENTION

Multi-purpose hose fitting are disclosed in U.S. Pat. No. 5,104,150 issued Apr. 14, 1992 and U.S. Pat. No. 5,257,826 issued Nov. 2, 1993 to Shannon Bard and Thomas N. Prassas, the inventors of the present invention. The disclosures of these 2 patents are expressly incorporated herein by reference. Our prior patents disclose an irrigation fitting that can connect together either irrigation tubing or garden hose having a threaded end with the same fitting. This invention extends that concept to provide a universal fitting which can be securely attached to either the female threaded end of a garden hose and several different sizes of impervious deformable plastic tubing suitably 0.580 hose, 0.620 hose and 0.700 O.D. hose.

To insure efficient water usage, modern irrigation systems deliver water in controlled amounts precisely to the desired plants so as to avoid runoff and evaporation. Two slightly different prior art designs have matured that are very popular. One prior art design employs previous or porous tubing, also known as soaker hose in the art. The other design employs impervious plastic tubing, usually polyethylene, to convey water through a collection of tee fittings, elbows, and couplings so as to distribute the water to the various plants. At each chosen location, a point source emitter attaches to the tubing with a barbed connector inserted through the tube wall. The second design is the subject of the present invention.

Manufacturers of the impervious plastic tubing have developed similar but different product lines where the plastic tubing of one manufacturer may have a different inside diameter than another manufacturer.

Couplings and fittings will work for one manufacturer's line of tubing but not for anothers. An owner of an irrigation system can become easily frustrated when having to make modifications and not knowing who was the manufacturer of the tubing line, purchasing fittings from one manufacturer only to have to return the fittings and replace them for the correct manufacturer's line.

It would be advantageous, however, if a single coupling was developed which could be used for different product lines of impermeable plastic tubing which could be combined to design a single water circuit which would incorporate different manufacturers tubing.

STATEMENT OF THE INVENTION

Briefly, the present invention discloses a multiple purpose fitting that serves the function of several different single purpose fittings in the prior art. The multi-purpose fitting accommodates solid tubing of various size and conventional threaded garden hose.

The multiple purpose fitting of the invention is formed of 3 parts. A hollow housing having at least 2 openings, a fixed stem member disposed within the housing aligned with the axis of one of the openings, a compression ring slidably mounted on the stem member and a circumferential member having external threads for connection to a standard hose connector, having a first end connected to said opening in the housing and a second end having said external threads and further having an internal compression ring for frictionally engaging a tube with a first outside diameter. An annular chamber is formed between the wall of the housing and the stem. The compression ring slides along the stem within the chamber and grips the inside walls of tubing having a diameter smaller than said first outside diameter.

Numerous benefits are realized with this multi-purpose fitting. When one is planning an irrigation system, the task is greatly simplified since one fitting design can be utilized to connect all sections of hose or tubing. The consumer need not count up the number of elbows, couplings, end caps and tees but rather purchase a batch of multi-purpose fittings. If the plan changes during installation, no problems arise. The system can be easily expanded in the future.

Further, periodic maintenance of an existing irrigation system will require the purchase of only one type of fitting. The owner will no longer have to be concerned with purchasing the correct fitting for a particular size tubing produced by a specific manufacturer.

Also, this invention will reduce the number of items that a store must stock. It is envisioned that the unit cost for this item will be lower due to less time involved in inventory and stocking operations when compared to stocking varied designs of fittings.

Additional advantages and benefits are elucidated in the following more detailed drawings and descriptions.

DETAILED DESCRIPTION OF THE INVENTION

Figure 1:
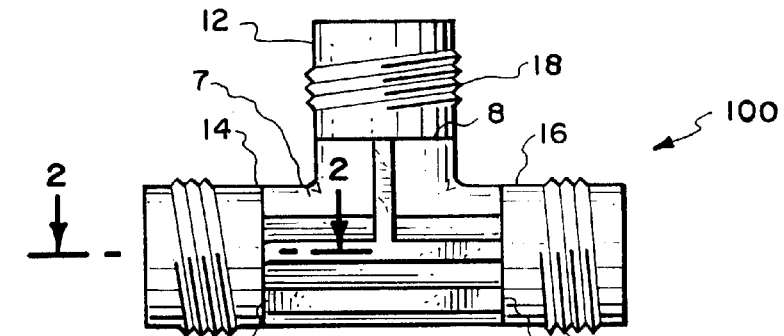
FIG. 1 is a front view in elevation of the multiple purpose fitting of the invention.
Figure 2:
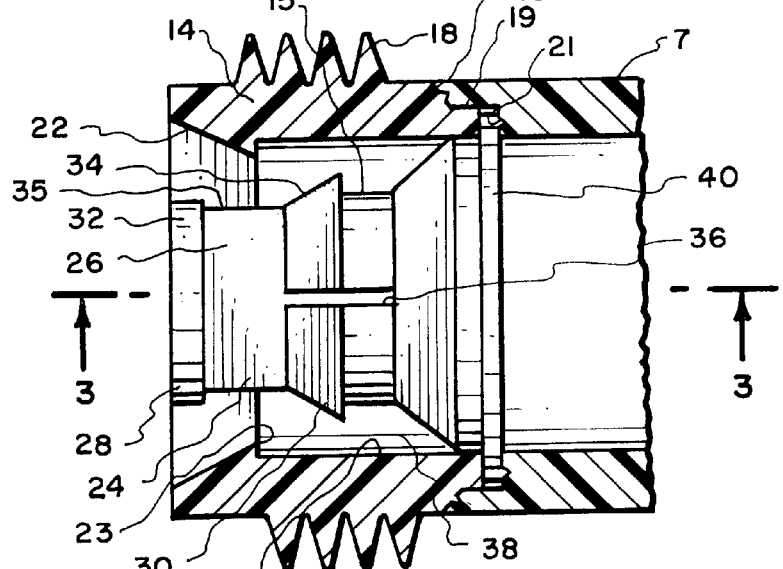
FIG. 2 is a cross-sectional view of the fitting taken along line 2—2 of FIG. 1.

Referring now to FIG. 1, the multiple purpose fitting 100 of the invention is formed of a housing 7 having openings 8, 9 and 10. At least one of the openings is configured to have the novel multiple purpose structure of the invention. In the fitting shown in FIGS. 2–6, each of the openings 8, 9, 10 includes a fixed stem member 15 on which a slide ring 30 having a slit 36 is mounted. Hollow nipple members 12, 14, 16 are attached to the openings 8, 9, 10 in the housing 7 forming an annular chamber 38 as shown in FIG. 2 between the inside wall 13 of the nipple 14 and the fixed stem member 15. Each stem member 15 has a base flange 40 which seats in a groove 19 in each opening 10 of the housing 7. The rear end of the nipple 14 has a lip 21 which fits into the groove 19 against the flange 40. The assembly is fastened by sonic welding when all the facing surfaces are formed of thermoplastic materials. The assembly could also be fastened by means of adhesive.

The multi-purpose fitting 100 of the present invention comprises a generally hollow, water conveying structure 7 with three openings. Any shape could be adopted but the preferred configuration of the fitting 100 is approximately in the shape of a tee with the openings at 90 degree relative angles. All three openings are attached to nipples 12, 14 and 16 having male threads 18 on the outside, to accommodate the industry standard hose threads. One or two caps (not shown) may be used to close off the nipples 12, 14 and 16 as necessary. The caps have interior threads to engage threads 18 on the outside of fitting 100. In the preferred embodiment, the fitting may be made from ABS plastic or the like. The nipples 12, 14 and 16 are preferably formed of a transparent, thermoplastic resin so that the chamber 38 and slide ring can be seen.

FIG. 2 shows a cut away view of nipple 14 depicting the novel structure of the fitting. The inner cavity of each nipple has a slide ring 30 which has a tapered surface 34 to vary the effective inside diameter of the fitting. Preferably, each nipple 12, 14 and 16 has an entry orifice formed between the tapered inside surface 22 of the nipple 14 and outer cylindrical head 32 of the stem 26. A hollow stationary barb 28 can be present on the end of hollow stem 26. The maximum diameter of barb 28 and slide ring 30 is smaller than the minimum inside diameter of the tapered surface 22 on compression ring 23.

As can be seen in FIG. 2, stationary barb 28 is positioned on the end of stem 26. Both barb 28 and slide ring 30 have tapered surfaces 35 and 34 respectively. Stem 26 has an outside circumference which tapers from the base of stationary barb 28 toward the interior of fitting 100.

The slide ring 30 is slidingly mounted about the circumference of stem 26. Slide ring 30 has a longitudinal slit 36. Slit 36 allows the diameter of slide ring 30 to vary which allows it to travel along stem 26 as will be discussed later.

Slide ring 30 has a maximum outside diameter which is greater than the maximum outside diameter of stationary barb 28. Stem 26, barb 28 and slide ring 30 are centered within nipples 12, 14 and 16 such that there is a uniform annular region or chamber 38 with the inside walls 13 of nipples 12, 14 and 16.

Each stem 26 has a base flange 40 which is mounted between the inside wall of the housing and nipples by sonic welding the base 40 to the housing 7 with the base 40 disposed between the housing 7 and its respective nipple. Base 40 prevents fluid flow through the annular region 38 of each opening, thereby channeling all flow through hollow stems 26.

The invention having been adequately described, each of the four hose attachments to the novel fitting will now be discussed.

I. SMALL DIAMETER IMPERVIOUS TUBING (ATTACHED TO SLIDE RING)

Figure 3:
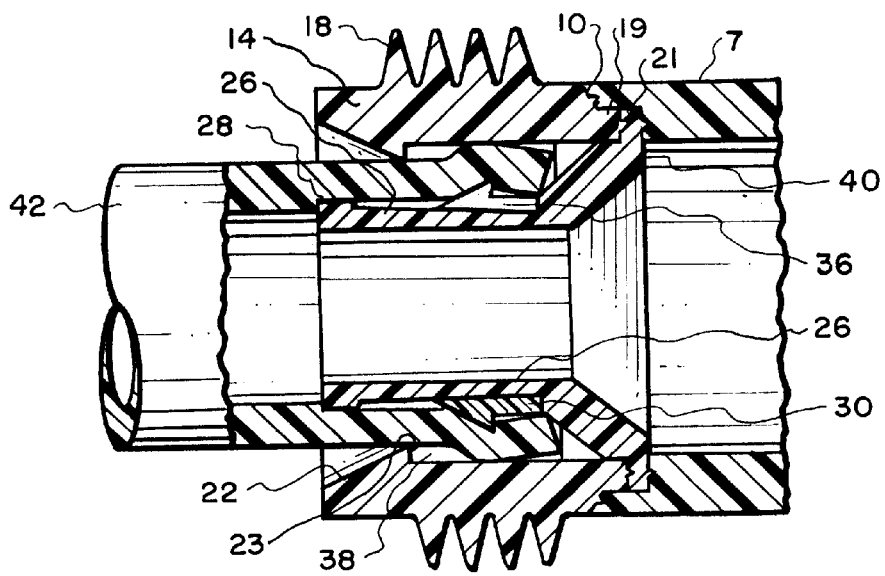
FIG. 3 is a cross-sectional view of the fitting taken along line 3—3 of FIG. 2 wherein the inside diameter of tubing is frictionally attached to a slide ring.

FIG. 3 illustrates the first type of tubing attachment to fitting 100. Tubing 42 is slid over the tapered circumference of stationary barb 28. The outside diameter of stationary barb 28 is used as a guide for proper alignment of the tubing with the invention. In the preferred embodiment, nipples 12, 14 and 16, the fitting 100 having male threads 18 are made of a transparent material so that slide ring 30 can be viewed through the nipples. Tubing 42 is pushed by hand into annular region 38 until tubing 42 passes over slide ring 30 so that slide ring 30 can not be observed through the transparent portion of fitting 100. Tubing 42 is thereafter attached by the frictional engagement of slide ring 30 with the inside diameter wall of tubing 42. To ensure complete frictional engagement, it is recommended that tubing 42 be pulled slightly. This will cause slide ring 30 to travel a slight distance up stem 26 and thereby cause slide ring 30 to expand slightly into an even greater frictional engagement with tubing 42.

II. MID-SIZE DIAMETER IMPERVIOUS TUBING (ATTACHED TO SLIDE RING)

Figure 4:
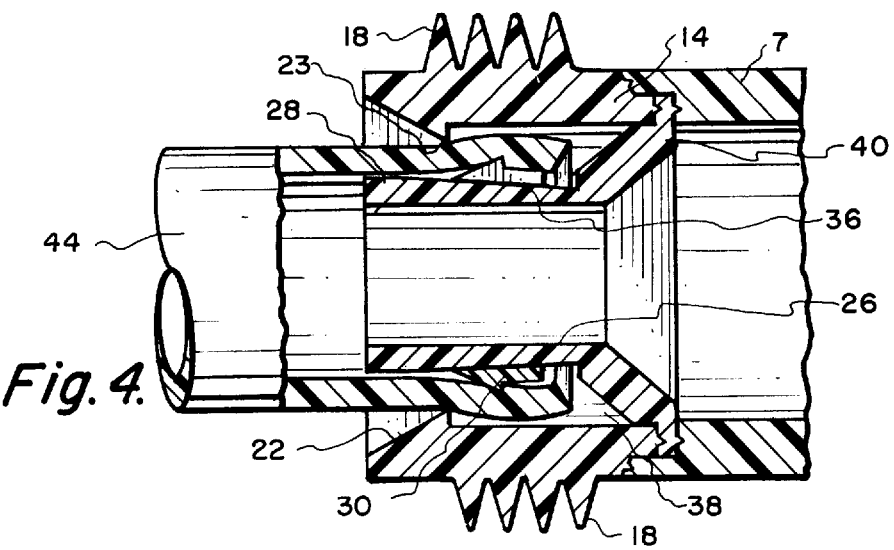
FIG. 4 is a cross-sectional view of the fitting taken along line 3—3 of FIG. 2 wherein tubing having a larger inside diameter than the tubing depicted in FIG. 3 is frictionally attached to the slide ring at a position closer to the stationary barb than shown in FIG. 3.

FIG. 4 illustrates the second type of tubing attachment to fitting 100. Tubing 44 is slid over the tapered circumference of stationary barb 28 and on over the tapered circumference of slide ring 30. The outside diameter of slide ring 30 is capable of engaging the inside diameter of tubing 44 and causing frictional attachment in the same manner as described above for tubing 42. Tubing 44 partially fills the annular region 38 and could contact compression ring 23. Whether or not this occurs is dependant upon the specific wall thickness of tubing 44. Fitting 100 is designed however, to maintain attachment to tubing 44 by the frictional engagement of slide ring 30 with the inside diameter wall of tubing 44. Tubing 44 has a larger inside diameter than tubing 42. The same method of attachment is utilized for tubing 44 as was used for tubing 42. Tubing 44 is pushed into annular region 38 until slide ring 30 is no longer observed through the transparent portion of fitting 100. Tubing 44 is thereafter attached by the frictional engagement of slide ring 30 with the inside diameter wall of tubing 44. Frictional engagement is accomplished by pulling tubing 44. This will cause slide ring 30 to travel a distance along stem 26 and thereby cause slide ring 30 to expand into frictional engagement with tubing 44. Because tubing 44 has an inside diameter greater than tubing 42, slide ring 30 must travel a greater distance up stem 26 to expand slide ring 30 to an appropriate diameter to properly engage the inside wall of tubing 44.

III. LARGE DIAMETER IMPERVIOUS TUBING (ATTACHED TO COMPRESSION RING)

Figure 5:
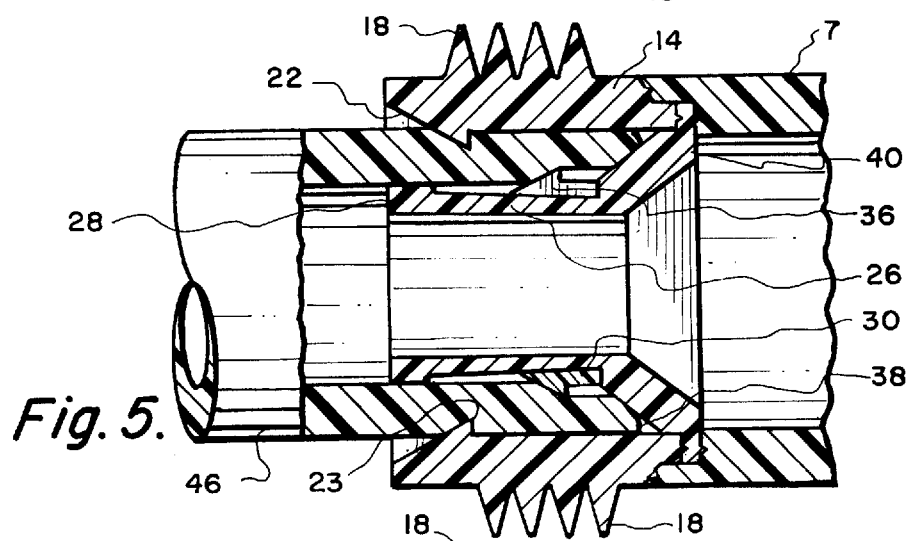
FIG. 5 is a cross-sectional view of the fitting taken along line 3—3 of FIG. 2 wherein the outside diameter of tubing having a larger inside diameter than that depicted in FIG. 4 is frictionally attached to a compression ring.

FIG. 5 illustrates the third type of tubing attachment to fitting 100. Tubing 46 has a larger outside as well as inside diameter than either tubing 42 or 44. The outside diameter of tubing 46 is slightly larger than the minimum diameter of compression ring 23. As tubing 46 is pushed into annular region 38 of fitting 100, the outside surface of tubing 46 frictionally engages compression ring 23. A pushing and twisting action may improve displacement of tubing 46 into annular region 38. As was recommended for the installation of tubing 42 and 44, it is preferred that tubing 46 be inserted into annular region 38 until slide ring 30 is no longer viewable through the transparent portion of fitting 100 and engaging base 40 of fixed stem 26. Although the slide ring 30 does not frictionally engage the inside wall of tubing 46, it is recommended that tubing 46 be displaced over slide ring 30 to ensure that compression ring 23 has a sufficient length of tubing surface to maintain frictional engagement. A slight pull is thereafter recommended to insure that compression ring 23 is in proper frictional engagement with the outside wall of tubing 46.

IV. GARDEN HOSE

Figure 6:
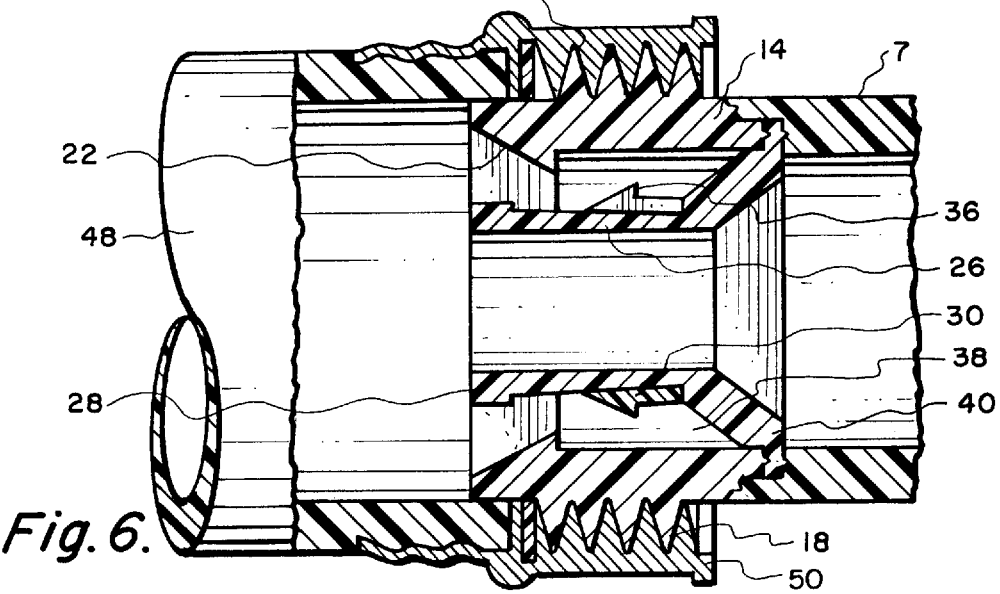
FIG. 6 is a cross-sectional view of the fitting taken along line 3—3 of FIG. 2 wherein the female end of a standard garden hose is threaded to male threads about the circumference of one end of the novel fitting.

FIG. 6 illustrates the fourth type of tubing attachment to fitting 100. Garden hose 48 having a female threaded end 50 can be attached to fitting 100 by threaded engagement with male threads 18.

Other modifications will become apparent to those skilled in the art which do not depart from the spirit and scope of this invention as defined by the appended claims.

We claim:

1. A multiple purpose irrigation system fitting for joining together both compatible and incompatible types of irritation hoses and tubes comprising:

a housing with multiple openings therein, at least a first of said openings having external male threads thereon for attachment to a female threaded connector on a first type of irrigation hose;

at least one of said first opening having an internal compression ring means for attachment to and for sealingly gripping the outside surface of a first irrigation tube inserted therein, said first tube comprising a second type of irrigation hose differing from the first type;

a water conveying hollow stem associated with at least said first opening, said stem being connected to said housing and positioned longitudinally within said housing, said stem further extending toward said first opening, the space formed between each said stem and the inside wall of said housing forming an annular region, each said hollow stem having a circumferential taper from said opening toward said housing connection;

a slide ring disposed on each of said hollow stems, said slide ring having an expansion slit permitting travel of said ring along the length of said respective stem for frictionally gripping the inside wall surface of a second tube inserted therein, said second tube comprising a third type of irrigation hose having an inside and/or outside diameter differing from the first and second types, said third type of irrigation hose having an outside diameter smaller than the minimum diameter of said compression ring; and each said slide ring having a first region for frictionally gripping an inside wall of a fourth type of irrigation hose inserted therein, having an outside diameter smaller than the minimum diameter of said compression ring and a different inside diameter than said third type of irrigation hose, said slide ring further including a second region along said system for frictionally engaging said third type of irrigation hose, said second region being located at a different location along said stem said fourth type having an inside and/or outside diameter differing from that of the second type and third type of irrigation hose.

2. The fitting of claim 1 wherein said housing is transparent to permit visual confirmation of hose insertion into any of said annular regions of said housing.

3. The fitting of claim 2 including at least one end cap having female threads therein for engaging said external threads on said openings so as to close said openings.

4. A multiple purpose irrigation system fitting for joining together both compatible and incompatible type hoses comprising:

a housing with multiple openings therein, each of said openings having external threads thereon for attachment to female threaded connectors on a first type of irrigation hose;

each of said openings having an internal compression ring for engaging and sealingly gripping the outside surface of a second type of irrigation hose;

a water conveying hollow stem associated with each of said openings, said stem being connected to said housing and positioned longitudinally within said housing, said stem further extending toward a selected one of said openings, the space formed between each said stem and the inside wall of said housing defining an annular region, each said hollow stem having a circumferential taper from said opening toward said stem connection to said housing;

a slide ring disposed on each of said hollow stems, said slide ring having an expansion slit permitting travel of said ring along the length of said stem for frictionally gripping the inside wall of a third type of irrigation hose, said third type of irrigation hose having an outside diameter smaller than the minimum diameter of said compression ring; and each of said slide rings having a first region on the outside surface for frictionally gripping the inside wall of a fourth type of irrigation hose inserted therein, said fourth type of irrigation hose having an outside diameter smaller than the minimum diameter of said compression ring and a different inside diameter than said third type of irrigation hose, said slide ring having a region along said stem different than the first region for frictionally engaging said third type of irrigation hose.

5. The fitting of claim 4 wherein said housing is transparent to permit visual confirmation that any hose inserted into any said opening of said housing is fully inserted into said annular region.

6. The fitting of claim 5 including at least one end cap having female threads therein for engaging said external threads on said openings so as to close said openings.

7. A multiple purpose irrigation system fitting for joining together both compatible and incompatible type hoses comprising:

a housing with multiple openings therein, at least one of said openings having external threads thereon for engaging female threaded connectors on a first type of irrigation hose;

at least one of said openings having an internal compression ring for engaging and sealingly gripping the outside surface of a second type of irrigation hose inserted therein;

a water conveying hollow stem associated with at least one of said openings, each said stem being connected to said housing and positioned longitudinally within said housing, said stem further extending toward a selected one of said openings, the space formed between each said stem and the inside wall of said housing forming an annular region, each said hollow stem having a circumferential taper from said opening toward the connection between said housing and the stem; and means for gripping the inside wall of a tube inserted into said housing, said tube comprising a type of irrigation hose having an outside diameter smaller than the minimum diameter of said compression ring.

8. The fitting of claim 7 wherein said housing is transparent to permit visual confirmation that any hose inserted into any said opening of said housing is fully inserted into said annular region.

9. The fitting of claim 7 wherein said gripping means comprises a slide ring disposed on each of said hollow stems, said slide ring having an expansion slit permitting travel of said ring along the length of said respective stem, said ring circumference varies according to its position along said tapered hollow stem for frictionally gripping the inside wall of tubing displaced about said hollow stem and having an outside diameter smaller than the minimum diameter of said compression ring.

10. The fitting of claim 9 wherein said housing is transparent to permit visual confirmation that any hose inserted into any said opening of said housing is fully inserted into said annular region.

* * * * *